United States Patent
Kitamura et al.

(10) Patent No.: US 10,780,538 B2
(45) Date of Patent: Sep. 22, 2020

(54) AUTOMATIC TOOL EXCHANGE SYSTEM FOR MACHINE TOOLS

(71) Applicant: KITAMURA MACHINERY CO., LTD., Toyama (JP)

(72) Inventors: Akihiro Kitamura, Toyama (JP); Kosaku Kitamura, Toyama (JP); Shigeru Yamada, Toyama (JP); Takashi Asano, Toyama (JP)

(73) Assignee: KITAMURA MACHINERY CO., LTD., Takaoka-shi (JP)

( * ) Notice: Subject to any disclaimer, the term of this patent is extended or adjusted under 35 U.S.C. 154(b) by 155 days.

(21) Appl. No.: 16/094,686

(22) PCT Filed: Apr. 18, 2017

(86) PCT No.: PCT/JP2017/015614
§ 371 (c)(1),
(2) Date: Oct. 18, 2018

(87) PCT Pub. No.: WO2017/183642
PCT Pub. Date: Oct. 26, 2017

(65) Prior Publication Data
US 2019/0118319 A1    Apr. 25, 2019

(30) Foreign Application Priority Data

Apr. 19, 2016 (JP) .................................. 2016-083543

(51) Int. Cl.
*B23Q 3/157* (2006.01)
*G05B 19/409* (2006.01)
*B23Q 3/155* (2006.01)

(52) U.S. Cl.
CPC ...... *B23Q 3/15503* (2016.11); *B23Q 3/15546* (2013.01); *B23Q 3/15766* (2013.01);
(Continued)

(58) Field of Classification Search
CPC ............ Y10T 483/123; B23Q 3/15503; B23Q 3/155–3/15793
USPC ............................................................. 483/5
See application file for complete search history.

(56) References Cited

U.S. PATENT DOCUMENTS 3,744,124 A * 7/1973 Gardner ............. B23Q 3/15546
                                                483/8
4,107,589 A * 8/1978 Eto ..................... B23Q 3/15546
                                                318/602
(Continued)

FOREIGN PATENT DOCUMENTS

CN    201 900 492 U    7/2011
EP      1 905 535 A2   4/2008
(Continued)

OTHER PUBLICATIONS

Machine Translation KR 20160057850 A, which KR '850 was published May 2016.*

(Continued)

*Primary Examiner* — Erica E Cadugan
(74) *Attorney, Agent, or Firm* — Bacon & Thomas, PLLC

(57) ABSTRACT

An automatic tool exchange system which allows a tool management mode to be arbitrarily selectable between a fixed address scheme and a memory random scheme in operation of the same machining center. The control unit for controlling the respective drive units of the tool exchanger and the magazine includes a storage unit for storing tool information containing a registered correspondence relationship between the tools and corresponding addresses of the stowage parts of the magazine, a modifying unit for modifying the tool information, and a tool exchange instruction unit for sequentially designating the tool to be used in each of the machining steps in accordance with the machining program, and driving the magazine to move the stowage part at the address corresponding to the designated tool to a (Continued)

predetermined position based on the tool information so that the tool is located at the exchange position at a predetermined timing. The control unit is configured to manage the tool in a mode selectively switchable between a first tool management mode in a fixed address scheme for returning the tool after use to a corresponding address, and a second tool management mode in a memory random scheme so as to stow the tool after use at an unoccupied address where the tool for next use has been previously stowed, and allow the modifying unit to modify the correspondence relationship between the tool after use and the address, which has been contained in the tool information.

4 Claims, 4 Drawing Sheets

(52) U.S. Cl.
CPC ........ *G05B 19/409* (2013.01); *B23Q 3/15539* (2016.11); *B23Q 3/15713* (2013.01); *B23Q 3/15722* (2016.11); *G05B 2219/50238* (2013.01); *Y10T 483/123* (2015.01); *Y10T 483/175* (2015.01); *Y10T 483/1755* (2015.01)

(56) References Cited

U.S. PATENT DOCUMENTS

| | | | | |
|---|---|---|---|---|
| 4,430,717 A | * | 2/1984 | Senda | G05B 19/182 198/349 |
| 4,631,465 A | * | 12/1986 | Fukuyama | G05B 19/4069 318/565 |
| 4,670,965 A | | 6/1987 | Sato et al. | |
| 2012/0028771 A1 | * | 2/2012 | Kitamura | B23Q 3/15539 483/65 |
| 2012/0116570 A1 | * | 5/2012 | Nishioka | B23Q 3/15503 700/179 |
| 2017/0176980 A1 | * | 6/2017 | Nishioka | B23Q 3/15533 |

FOREIGN PATENT DOCUMENTS

| | | | | |
|---|---|---|---|---|
| JP | 57-156143 A | * | 9/1982 | |
| JP | 57-201147 A | | 12/1982 | |
| JP | 61-76246 A | | 4/1986 | |
| JP | 62-34743 A | | 2/1987 | |
| JP | 63-89242 A | | 4/1988 | |
| JP | 02-198737 A | * | 8/1990 | |
| JP | 4-322934 A | | 11/1992 | |
| JP | 11-70441 A | | 3/1999 | |
| KR | 20160057850 A | * | 5/2016 | |
| WO | 2016/031324 A1 | | 3/2016 | |

OTHER PUBLICATIONS

Search Report dated Feb. 20, 2020, in corresponding European Application No. 17785980.8.

Search Report issued in corresponding International Application No. PCT/JP2017/015614.

International Preliminary Report dated Oct. 23, 2018, in corresponding International Application No. PCT/JP2017/015614.

* cited by examiner

Fig. 1
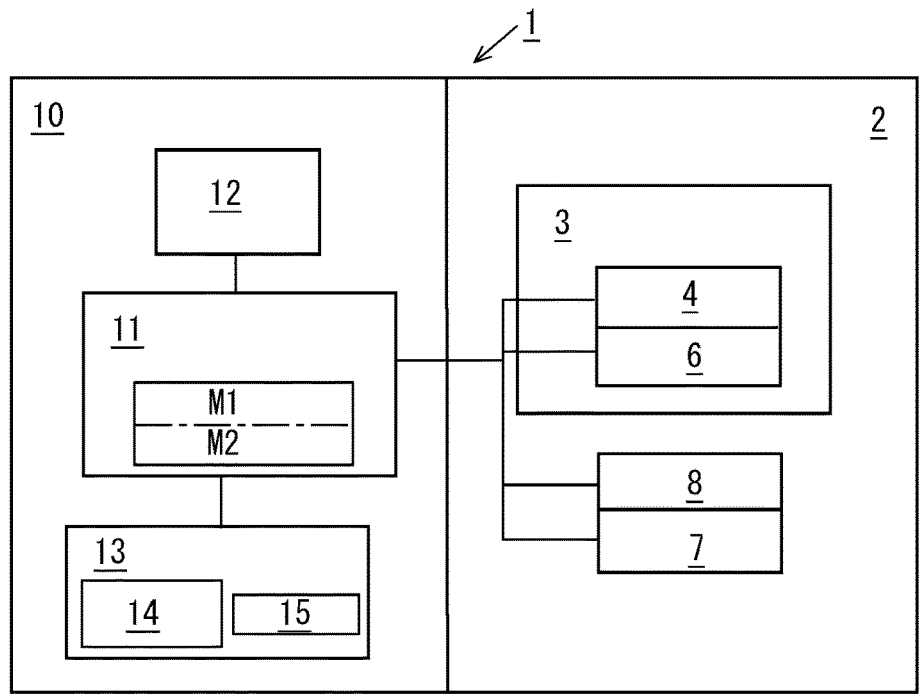
Fig. 2a
Fig. 2b
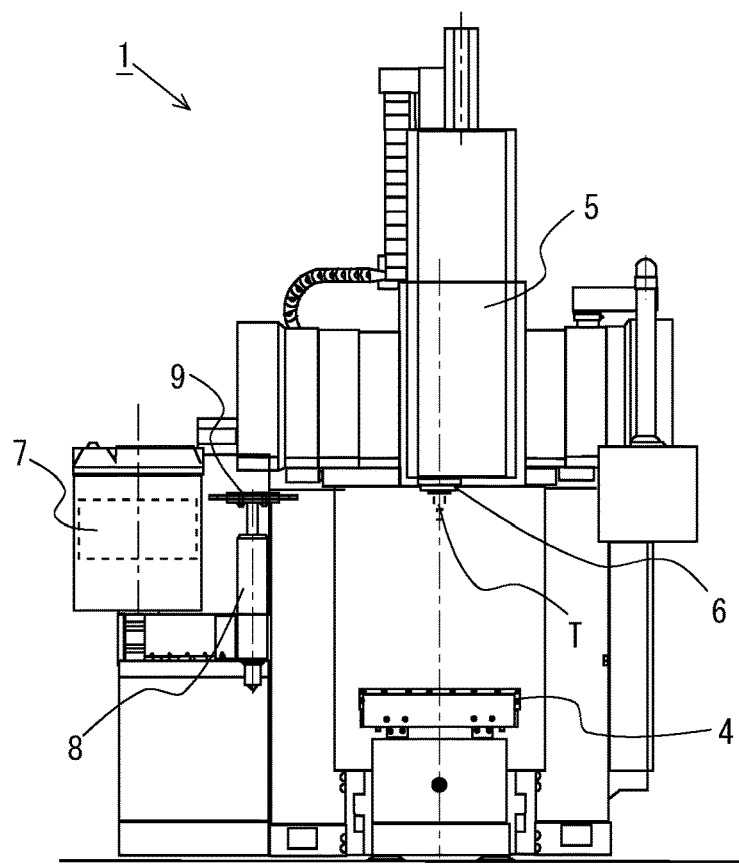
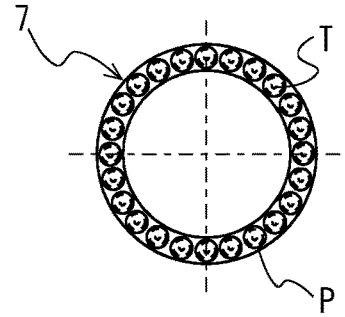

AUTOMATIC TOOL EXCHANGE SYSTEM FOR MACHINE TOOLS

TECHNICAL FIELD

The present invention relates to an automatic tool exchange system configured to mount a specific tool that has been selected from a large number of tools stowed in the magazine onto a rotary main shaft of a main body of a machine tool, and to stow a tool that has been demounted from the rotary main shaft into the magazine.

BACKGROUND ART

The machining center having the main body of the machine tool numerically controlled by the NC unit is configured to automatically exchange the tool to be mounted onto the rotary main shaft of the main body of the machine tool in the respective machining steps in accordance with the predetermined machining program.

An automatic tool exchange system provided for the above-described machining center mainly includes a magazine that stows a plurality of tools, and a changer for carriage and exchange of the tools between the rotary main shaft and the magazine. The above-described automatic tool exchange system generally allows its control unit to control the respective drive units inter-connectedly. The automatic tool exchange system with a plurality of magazines either of drum type or chain type has also been employed adapted to a large number of tools to be stowed.

For example, the tools held with the common tool holders are inserted into common pots stowed in stow parts of the magazine, respectively. The tool taken from the pot is mounted onto the rotary main shaft by detachably clamping a pull-stud bolt at one end of the tool holder with a clamp mechanism formed at a tip end of the rotary main shaft.

The automatic tool exchange system serves to exchange tools in accordance with the machining program in response to a request of taking the tool to be used in the individual machining step. For the tool exchange operation, the stowage part of the magazine, and the address of the tool designated for the individual machining step are calculated so that the stowage part is selectively moved. The tool located at an exchange position is automatically exchanged with the tool after use which has been mounted onto the rotary main shaft. The tools are normally managed based on tool numbers given to the respective tools.

For example, tool numbers and tool names or tool types of the corresponding tools are listed into a correspondence table together with such data as the tool diameter and the tool length so that the tool file is prepared. Based on the tool file, upon stowage of the tool in the magazine, the correspondence relationship between the address of the stowage part and the tool number of the corresponding tool stowed at the address is registered as the tool information in the control unit, for example, the storage unit of the NC unit. This makes it possible to manage the tools based on the tool number in the individual machining step from designation of the tool to returning of the tool after use to the magazine.

The machining center provided with a plurality of magazines is configured to drive one of the magazines so that the stowage part of the tool to be handled by the automatic tool exchange system is moved to a predetermined standby position, and to execute the tool exchange subsequent to carriage of the tool or the pot with the tool from the standby position to the exchange position.

For example, the system disclosed in Patent Literature 1 is configured to move the first tool to be next mounted from the magazine to the standby position via the moving arm and the guide, and exchange the first tool with the second tool after use between the standby position and the rotary main shaft. In the above-described case, the control unit of the changer locates the position (address) on the magazine at which the first tool to be next mounted has been disposed. Then the magazine is rotated to locate the address at the prescribed position so that the first tool is moved by the moving arm to the inlet of the guide while being held in the pot, and guided to the standby position via the guide.

As described above, the first tool in the pot is disposed at the standby position, and the rotary main shaft is disposed at the exchange position. The grippers at both ends of the exchange arm which turns between those positions grip the second tool after use and the first tool at the standby position. Then the second tool is demounted from the rotary main shaft, and the first tool is taken from the pot. And the respective positions of the tools are interchanged by turning the exchange arm at 180°. Then the first tool is mounted onto the rotary main shaft, and the second tool is inserted into the unoccupied pot at the standby position. Thereafter, the grippers at both ends of the arm release the respective tools, the rotary main shaft is returned to the machining region, and the arm is relatively retracted into the region where the machining operation is not interfered. The tool exchange operation is then finished, allowing the process to proceed to the next machining operation.

The tool after use may be returned to the stowage part in the magazine in accordance with one of two schemes. In one scheme called the fixed address scheme, the respective tools are returned to the preliminarily specified positions (addresses) on the magazine. In the other scheme called the memory random scheme, the tool is returned to the address of the currently unoccupied position in the exchange operation, that is, the position at which the tool or the pot with the tool to be next mounted has been taken out.

According to the fixed address scheme, the respective tools after use are returned to the uniquely allocated addresses, respectively. It is therefore easy for the operator to manage the tools. According to the system as disclosed in Patent Literature 1, the second tool after use is moved from the standby position to the inlet of the guide, and returned by the moving arm together with the pot to the originally specified address on the magazine, which has been allocated to the second tool.

Meanwhile, according to the memory random scheme, the address of the magazine that has stowed the tool before it is taken out for next use is kept unoccupied. The tool or the pot with the tool after use may be returned to the address of this unoccupied position. It is not necessary to move the specific address by rotating the magazine when returning the tool, thus minimizing the tool exchange time.

CITATION LIST

Patent Literature

Patent Literature 1

Publication of Japanese Patent No. 4972120

SUMMARY OF INVENTION

Technical Problem

According to the memory random scheme, however, as the tool after use is to be stowed at the address of the unoccupied position of the magazine in the exchange operation, the stowage address is changed from the previous one. If the stowage address is changed repeatedly, the address at which the individual tool is stowed will be changed at every use. Therefore, the tool management may become complicated and troublesome procedures for the operator, causing the problem of the trigger for the management error. If the above-described management error occurs, the wrong tool may possibly be used in the subsequent machining operations.

According to the fixed address scheme, the tool after use has to be returned to the corresponding address, thus requiring the time for driving the magazine to move the address position to the predetermined position. This may cause the problem of the prolonged tool exchange time compared with the memory random scheme.

Actually, some automatic tool exchanger installed in the machining center may be structured to easily employ the fixed address scheme. On the other hand, there may be the automatic tool exchanger substantially adaptable only to the memory random scheme alternative to the fixed address scheme which requires too much time for exchanging the respective tools.

In view of the above-described problems, it is an object of the present invention to provide the automatic tool exchange system which allows arbitrary selection of the tool management between the fixed address scheme and the memory random scheme in operation of the same machining center.

Solution to Problem

In order to achieve the above-described object, an automatic tool exchange system for machine tools is provided for executing a series of operations of machining a work while exchanging tools adapted to different machining steps in accordance with a predetermined machining program.

The system includes
one or more magazines in which the tools are individually stowed in a plurality of stowage parts to which corresponding addresses are allocated, respectively,
a tool exchanger for exchanging the tool after use, which has been mounted onto a rotary main shaft of a main body of the machine tool and the tool for next use, which has been kept in a standby state at an exchange position, and
a control unit for driving drive units of the tool exchanger and the magazine, respectively under control.

The control unit includes a storage unit for storing tool information containing a registered correspondence relationship between the tool and corresponding address of the stowage part of the magazine in which the tool is stowed, a modifying unit for modifying the tool information, and a tool exchange instruction unit for sequentially designating the tool to be used in each of the machining steps in accordance with the machining program, and driving the magazine to move the stowage part at the address corresponding to the designated tool to a predetermined position based on the tool information so that the tool is located at the exchange position at a predetermined timing.

The control unit is configured to manage the tool in a mode selectively switchable between a first tool management mode for managing the tool in a fixed address scheme so that the tool after use is returned to a stowage part at a registered corresponding address, and a second tool management mode for managing the tool in a memory random scheme so as to stow the tool after use in an unoccupied stowage part of the magazine at the address where the tool for next use has been previously stowed, and allow the modifying unit to modify the correspondence relationship between the tool after use and the address, which has been registered in the tool information.

The automatic tool exchange system for machine tools includes a selector switch disposed on an operation panel of an NC device connected to the main body of the machine tool. The selector switch serves as a tool management mode switching unit for selectively switching the tool management mode between the first tool management mode and the second tool management mode.

The automatic tool exchange system for machine tools further includes a carrier device for moving the tool to the exchange position from the stowage part in the magazine which has been moved to the predetermined position for exchanging the tool.

In the automatic tool exchange system for machine tools, the tool information contains a tool number given to each of the respective tools, a tool name and/or a tool type, and dimension data including a diameter and a length of the tool.

Advantageous Effects of Invention

The automatic tool exchange system for machine tools according to the present invention allows selection of the tool management mode between the first tool management mode of fixed address scheme and the second tool management mode of memory random scheme in accordance with the machining program in operation of the same machine tool. Therefore, the tools may be automatically exchanged for the individual machining step in the tool management mode optimal for the machining program more efficiently, improving the work efficiency all through the machining program.

BRIEF DESCRIPTION OF DRAWINGS

FIG. 1 is a block diagram conceptually showing a structure of the automatic tool exchange system according to an example of the present invention.

FIG. 2 is a view schematically showing an exemplary structure of the machining center provided with the automatic tool exchange system according to the present invention, wherein FIG. 2a is a side view of a main body of a machine tool, and FIG. 2b is a schematic plan view of a magazine.

DESCRIPTION OF EMBODIMENTS

Figure 3:
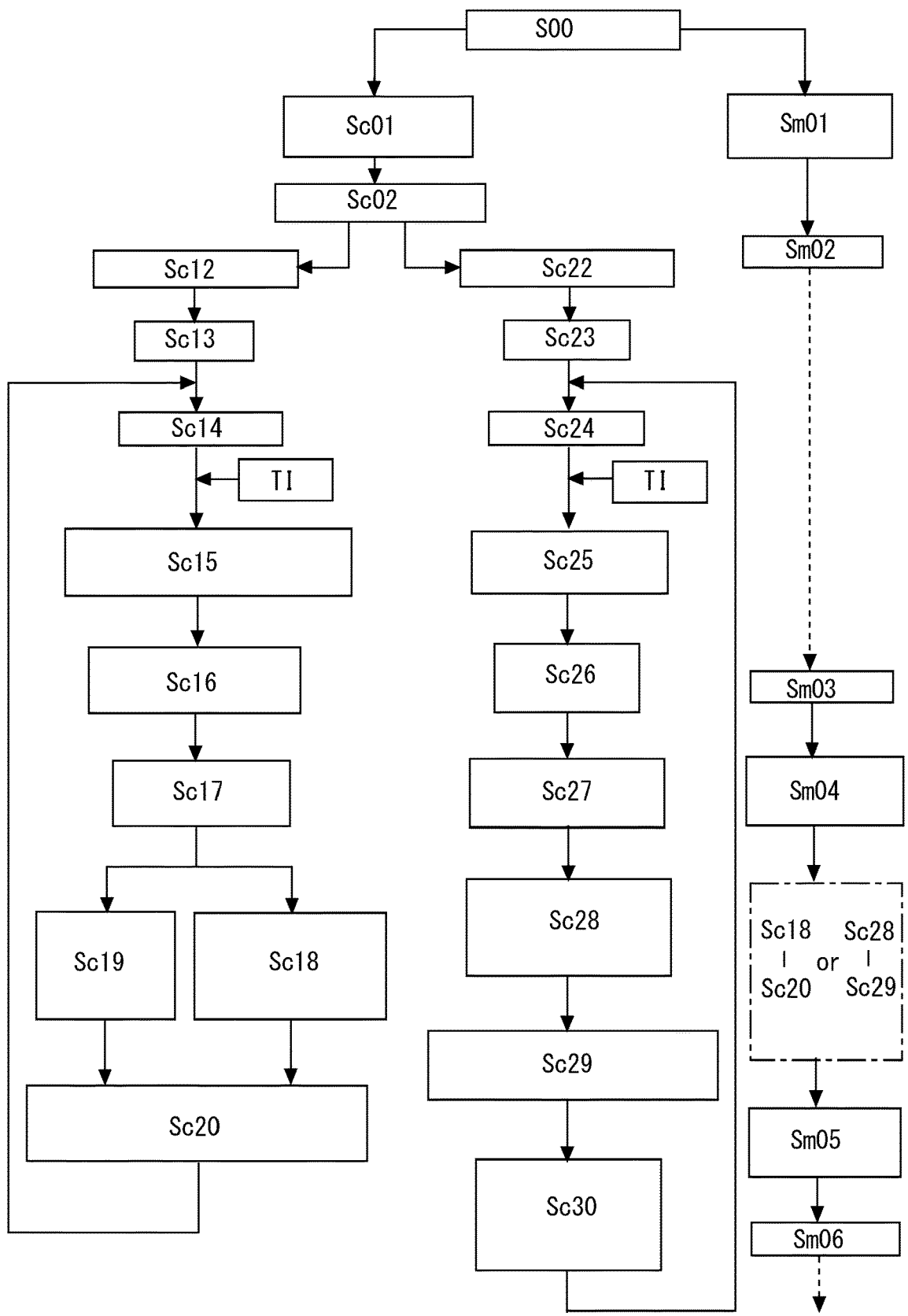
FIG. 3 is a flowchart representing an operation flow of the automatic tool exchange system as shown in FIG. 2.
Figure 4:
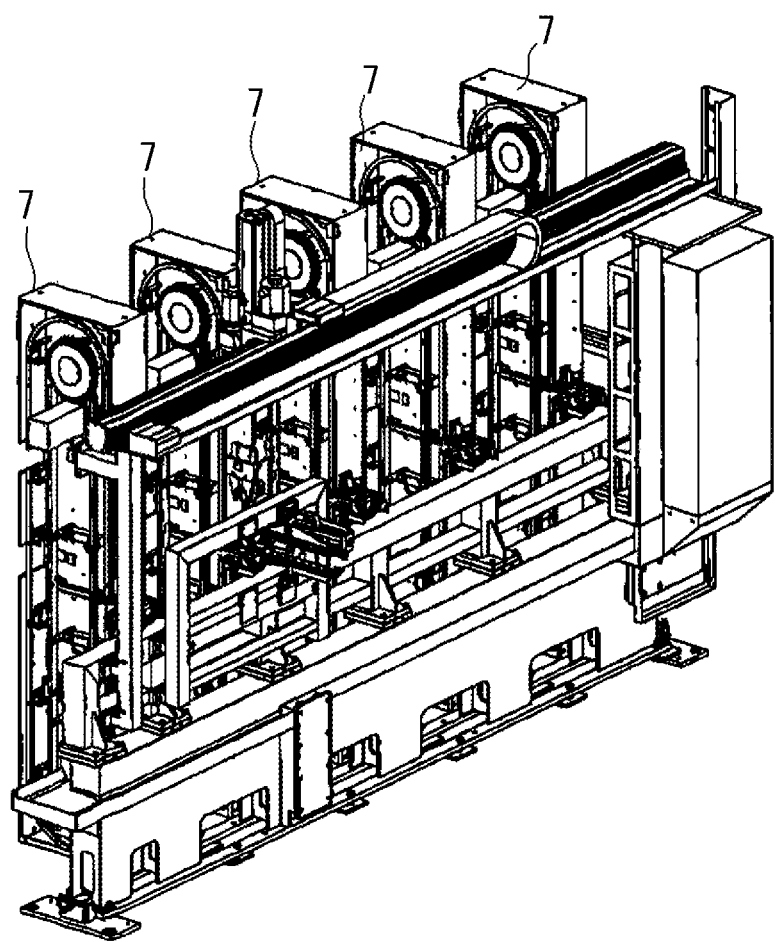
FIG. 4 schematically depicts a plurality of magazines.
Figure 5:
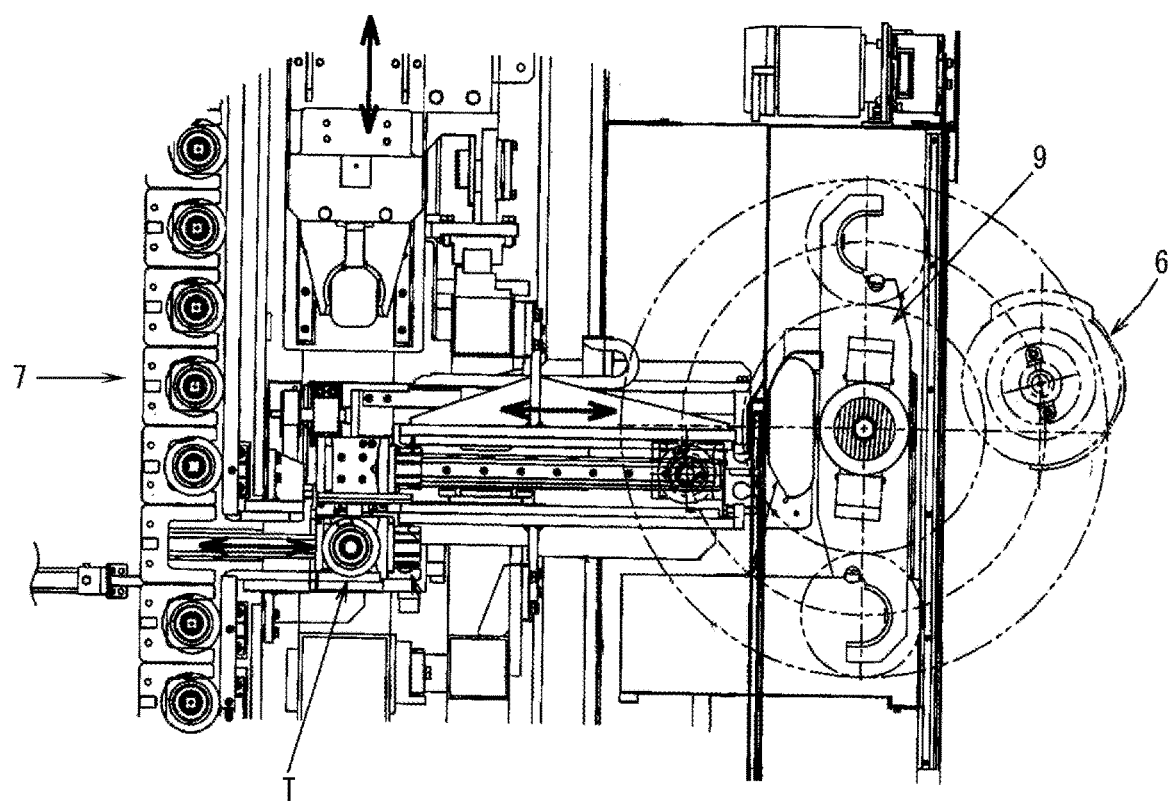
FIG. 5 schematically depicts a carrier device for moving the tool to the exchange position from a stowage part in a magazine.

The present invention provides the automatic tool exchange system for machine tools for executing a series of operations of machining a work while exchanging tools adapted to different machining steps in accordance with a predetermined machining program. The system includes one or more magazines in which the tools are individually stowed in a plurality of stowage parts to which corresponding addresses are allocated, respectively, a tool exchanger for exchanging the tool after use, which has been mounted onto a rotary main shaft of a main body of the machine tool and the tool for next use, which has been kept in a standby state at an exchange position, and a control unit for driving drive units of the tool exchanger and the magazine, respectively under control. The control unit includes a storage unit for storing tool information containing a registered correspondence relationship between the tool and corresponding address of the stowage part of the magazine in which the tool is stowed, a modifying unit for modifying the tool information, and a tool exchange instruction unit for sequentially designating the tool to be used in each of the machining steps in accordance with the machining program, and driving the magazine to move the stowage part at the address corresponding to the designated tool to a predetermined position based on the tool information so that the tool is located at the exchange position at a predetermined timing. The control unit is configured to manage the tool in a mode selectively switchable between a first tool management mode for managing the tool in a fixed address scheme so that the tool after use is returned to a stowage part at a registered corresponding address, and a second tool management mode for managing the tool in a memory random scheme so as to stow the tool after use in an unoccupied stowage part of the magazine at the address where the tool for next use has been previously stowed, and allow the modifying unit to modify the correspondence relationship between the tool after use and the address, which has been registered in the tool information.

It is therefore possible to select more preferable tool management scheme in operation of the same machine tool, adapted to the actually executed machining programs each having different contents. For example, the machining program having the relatively short machining steps may require the extra time waiting for start of the next machining step as a result of the time secured for moving the stowage part at the address unique to the tool after use before completion of the next tool exchange without taking the additional time for the start of the next machining step. In the above-described case, the second tool management mode of memory random scheme may be selected because of short cycle time for the exchange operation. This makes it possible to facilitate transition to the individual machining step with good efficiency, improving the machining work efficiency all through the operation.

Meanwhile, if the machining program requires exchange of a large number of tools as a whole although sufficient time may be secured until start of the next machining step, the first tool management mode of fixed address scheme may be selected so as to eliminate the need of modifying the tool information for every tool exchange cycle repeatedly performed a large number of times, thus avoiding the management error responsible for the operator.

More specifically, the control unit determines the start of the automatic tool exchange in the individual machining step according to the machining program, and calculates the address of the stowage part of the magazine which stows the tool designated to be subsequently used. The control unit then drives the drive unit of the magazine under control to rotate the magazine so that the stowage part at the calculated address is moved to the exchange position. The address of stowage part of the designated tool may be calculated based on the tool information which has been preliminarily registered in the storage unit installed in the control unit.

The tool information represents the correspondence relationship between the address of the magazine stowage part and the tool stowed in this stowage part at the address. Likewise the generally employed process, the tool may be easily managed based on the tool number given to the corresponding tool. The tool file has been conventionally formed as the correspondence table which contains the tool number and the type of the tool together with such data as diameter and length. Upon stowage of the tool in the magazine, based on the tool file, the correspondence relationship between the tool number and the address of the stowage part may be generated as the tool information so as to be registered in the storage unit.

In response to an output of the machining program, a machining command to the machining unit, and a tool exchange command to the tool exchange system will be executed to the main body of the machine tool in synchronization with each other. In the above-described case, the tool management mode may be selected before starting execution of the tool exchange command. The tool management mode to be selected may be preliminarily set for the individual machining program. Alternatively, it is possible to allow the operator to arbitrarily select the mode. In the case where the machining program for the single work includes a large number of machining steps, the system allows switching of the tool management mode even in the middle of the machining program, adapted either to the part having the continued machining steps suitable to be managed in the fixed address scheme, or the other part having the continued machining steps suitable to be managed in the memory random scheme.

The machine tool having its main body numerically controlled by the NC unit, that is, the machining center normally allows selection and input of the machining operation in accordance with the information displayed on the display unit on the operation panel of the NC unit. Assuming that a selector switch is provided on the operation panel as the tool management mode switching unit for selectively switching the tool management mode, the operator is allowed to easily select the tool management mode suitable for the machining program arbitrarily by operating the switch. In such a case, it is preferable to set so that the tool management mode selection screen is displayed on the display unit.

If the first tool management mode of fixed address scheme is selected, upon start of the tool exchange command, subsequent to the operation for taking the tool for next use from the stowage part of the magazine, the control unit executes drive control of the drive unit of the magazine for rotation so as to locate the stowage part at the address corresponding to the tool after use, which has been registered in the tool information at the exchange position. After interchanging the respective positions of the tools, the tool after use is returned to the stowage part at the original address.

Meanwhile, if the second tool management mode of memory random scheme is selected, the magazine is kept from being rotatably driven even after taking the tool for next use from the stowage part of the magazine. The tool after use having its position interchanged is stowed in the currently unoccupied stowage part of the magazine at the exchange position, which has been occupied by the tool for next use just before the taking operation. It is therefore necessary to update the tool information by modifying the correspondence relationship between the tool after use and the stowage part address at which such tool is stowed. It is possible for the operator to update the tool information registered in the storage unit by inputting modification of the corresponding part.

For example, the control unit may be configured to update the tool information stored in the storage unit by performing a series of operations for displaying the instruction to update the tool information on the display unit of the operation panel of the NC unit, and allowing the operator to input the modification of the correspondence between the address of the magazine stowage part at the exchange position at which the tool after use is stowed, and the tool number of the tool after use via the keyboard provided for the operation panel of the NC unit as a modifying unit.

If the single magazine is installed in the machining center, the stowage part at the subject address may be moved to the exchange position only by driving the magazine to rotate. If a plurality of magazines are installed, it is difficult to move the stowage part at the subject address directly to the exchange position. Therefore, the carrier device is further added so that the tool is moved from the magazine to the exchange position. In other words, the control unit executes the drive control so that the stowage part at the subject address of the magazine is moved to the predetermined position for the carriage operation. The carrier device serves to move the tool in the stowage part at the predetermined position to the exchange position. In the above-described case, it is possible to move the tool from the predetermined position to the exchange position while being kept inserted in the pot.

Example

The automatic tool exchange system for machine tools according to an example of the present invention will be described referring to FIGS. 1 to 3. FIG. 1 is a block diagram conceptually showing the structure of the automatic tool exchange system according to the example. FIG. 2 is a view schematically showing an exemplary structure of the machining center provided with the automatic tool exchange system according to the example, wherein FIG. 2(a) is a side view mainly showing the main body of the machine tool, and FIG. 2(b) is a schematic plan view of the magazine. FIG. 3 is a flowchart representing the operation flow executed by the automatic tool exchange system according to the example in a simplified manner by omitting detailed explanations of synchronous operations performed by the machining unit of the main body of the machine tool.

An NC unit 10 is connected to a main body 2 of the machine tool of the machining center 1 for numerical control. In accordance with the machining program input to a control unit 11 of the NC unit 10, drive control is executed for operating a machining unit 3 and an automatic tool exchange (ATC) system synchronously with each other.

The machining unit 3 includes a table 4 on which the work controlled to be driven in an XY direction is placed, and a rotary main shaft 6 mounted on the lower part of a main shaft head 5 controlled to be driven in a Z direction with respect to the table 4. A clamp unit (not shown) is disposed at a lower end of the rotary main shaft 6. A tool T is mounted onto the rotary main shaft 6 by clamping a pull-stud bolt at a tip end of a tool holder with which the tool T is fitted by means of the clamp unit. As the clamp unit is controlled to be driven into an open state, the tool T may be made demountable from the rotary main shaft 6.

A magazine 7 and a tool exchanger 8 both constituting the automatic tool exchange system are disposed at the side of the machining unit 3. The magazine 7 includes a plurality of pots P each serving as a stowage part, which are connected with one another for accommodating the tool T inserted from a tool holder side so that the tools T are held. Addresses are allocated to the respective pots P one by one. The control unit 11 controls the magazine 7 to be driven for rotation so that the pot P at an arbitrary address is selectively located at a predetermined exchange position.

The tool exchanger 8 includes a vertically standing rotary shaft, and an exchange arm 9 having both ends extending from the center of the rotary shaft so that a T-like shape is formed. Both ends of the exchange arm 9 serve as grippers from which the tools T are released. The tool T for next use located at the exchange position of the magazine 7 is gripped at one end of the exchange arm 9. The tool T after use mounted onto the rotary main shaft 6, which is located at the exchange position is gripped at the other end of the exchange arm 9. The tools T which have been respectively taken from the pot P and the rotary main shaft 6 are interchanged the respective positions of the tools T by turning the arm at 180° around the rotary shaft so as to be exchanged.

The correspondence relationship between the tool T and the address of the pot is registered as the tool information in the storage unit 12 upon stowage of the tool T into the corresponding pot P of the magazine 7. Normally, the tool numbers are preliminarily given to the corresponding tools T so as to generate the tool file in which each of the tool numbers is made corresponded to the tool data, for example, the corresponding tool name and/or tool type, the tool diameter, and the tool length. It is therefore possible to perform the tool management in reference to the tool information based on the thus generated tool file.

The control unit 11 is configured to manage the tool to be used in execution of the machining program either in the first tool management mode M1 of fixed address scheme or the second tool management mode M2 of memory random scheme. The management mode may be selectively switched in accordance with the individual machining program setting, or the operator's operation of a selector switch 15 on the operation panel 13.

The automatic tool exchange operations performed by the machining center 1 provided with the above-described automatic tool exchange system will be described referring to the flowchart of FIG. 3.

Upon output of the machining program (step S00) which has been input to the control unit 11 of the NC unit 10, the automatic tool exchange command to the tool exchange system (step Sc01) and the machining command to the machining unit 3 of the main body 2 of the machine tool (step Sm01) are started. Then in the automatic tool exchange system, the tool management mode selection (step Sc02) is executed in accordance with the machining program setting, or the operator's operation.

When the first tool management mode M1 (step Sc12) of the fixed address scheme is selected, the tool exchange operation in the first tool management mode M1 is started (step Sc13). In the subsequent steps, the routine of the tool exchange operations in the first tool management mode will be repeatedly executed until the last machining step of the machining program unless otherwise switched to the other tool management mode.

In accordance with the machining program, the machining unit 3 starts the machining operation (step Sm02) of the machining step in response to the machining command (step Sm01). As the machining step is about to end, the automatic tool exchange system designates the tool (number) (step Sc14), which will be used for the next machining step. Based on the tool information (TI) registered in the storage unit 12, the fixed address of the designated tool for next use in the magazine 7, and the fixed address of the tool after use, which has been mounted onto the rotary main shaft 6 are calculated (step Sc15).

Then the magazine 7 is driven to rotate (step Sc16) so that the pot at the fixed address is moved to the tool exchange position. The tool for next use stowed in the pot P at the calculated fixed address is located at the exchange position (step Sc17), and is kept standby. At the same timing, at the end of the machining step executed by the machining unit 3, the machining operation is stopped (step Sm03). The rotary main shaft 6 is then moved together with the main shaft head 5, and the tool after use mounted onto the main shaft 6 is located at the exchange position (step Sm04).

In the state where the tool for next use and the tool after use are located at the exchange positions, respectively, the tool exchanger 8 is driven to allow the exchange arm 9 to interchange position the tool for next use and the tool after use (step Sc18). The magazine 7 is driven to rotate so that the pot at the previously calculated fixed address of the tool after use is moved to the exchange position (step Sc19).

The tool for next use is mounted onto the rotary main shaft 6, and the tool after use is stowed in the pot P at the fixed address moved to the exchange position (step Sc20). Meanwhile, in the machining unit 3, upon mounting of the tool for next use onto the rotary main shaft 6, the main shaft head 5 is driven to move the rotary main shaft 6 and the tool to a machining starting position (step Sm05). Then the machining operation in the next machining step is started (step Sm06). In the subsequent machining steps, a series of operations for designating the tool number, exchanging the tool for next use and the tool after use, mounting of the tool onto the main shaft, and stowing will be repeatedly executed.

Although the first tool which is used in the first machining step is not shown, such tool is mounted onto the rotary main shaft 6 in the similar manner to the one for the tool for next use in the automatic tool exchange operation. The machining unit 3, first, moves the rotary main shaft 6 to the exchange position. Then upon mounting of the first tool onto the rotary main shaft 6 by the tool exchanger in the step similar to the one as described above, the rotary main shaft 6 is moved to the machining starting position so as to start the machining operation in the first machining step.

If the second tool management mode M2 (step Sc22) of memory random scheme is selected, as the tool exchange operation is started (step Sc23), the routine for the tool exchange operations in the second tool management mode will be repeatedly executed until the last machining step of the machining program unless otherwise switched to the other tool management mode.

In accordance with the machining program, the machining unit 3 starts the machining operation in the machining step (step Sm02). As the machining step is about to end, the automatic tool exchange system designates the tool (number) to be used for the next machining step (step Sc24). Based on the tool information (TI) registered in the storage unit 12, the stowage address of the designated tool for next use in the magazine 7 is calculated (step Sc25).

The magazine 7 is driven to rotate (step Sc26) so that the stowage address is moved to the tool exchange position. The tool for next use stowed in the pot P at the subject address is located at the exchange position (step Sc27), and kept standby. At the same timing, when the machining unit 3 finishes the machining step to stop the machining operation (step Sm03), the rotary main shaft 6 is moved together with the main shaft head 5. Then the tool after use mounted onto the main shaft 6 is located at the exchange position (step Sm04).

In the state where the tool for next use and the tool after use are located at the exchange positions, respectively, the tool exchanger 8 is driven to allow the exchange arm 9 to interchange position the tool for next use and the tool after use (step Sc28). Then the tool for next use is mounted onto the rotary main shaft 6, and the tool after use is stowed in the unoccupied pot P which has been occupied by the tool for next use at the exchange position (step Sc29). Meanwhile, upon mounting of the tool for next use onto the rotary main shaft 6, the machining unit 3 drives the main shaft head 5 to move the rotary main shaft 6 and the tool to the machining starting position (step Sm05), and the machining operation in the next machining step is started (step Sm06).

When the tool after use is stowed in the unoccupied pot, and the next machining step is started, the screen for updating the tool information is displayed on the display unit 14. The operator updates the tool information (step Sc30) by modifying the previous address corresponding to the tool after use to the address of the pot P in which the tool after use is currently stowed through the input unit such as the keyboard of the operation panel 13. In the subsequent machining steps, the above-described operations from the tool number designation to the tool information update by modifying the address of the tool after use will be repeatedly executed.

As described in the example, the automatic tool exchange system according to the present invention allows selection of the optimal tool management mode in accordance with the content of the machining program to be executed by the machining center 1. This makes it possible to perform efficient automatic tool exchange, adapted to various machining programs.

In the above-described example, the machining center is provided with the magazine 7 of drum type. However, employment of the magazine of chain type is also effective without being limited to the one as described above. If a plurality of magazine are installed, the carrier device for moving the tool between the magazine and the exchange position may be provided. The carrier device may be configured to be moveable between the magazines.

REFERENCE SIGNS LIST

1: machining center,
2: main body of machine tool,
3: machining unit,
4: table,
5: main shaft head,
6: rotary main shaft,
7: magazine,
8: tool exchanger,
9: exchange arm,
10: NC unit,
11: control unit,
12: storage unit,
13: operation panel,
14: display unit,
15: selector switch,
M1: first tool management mode (fixed address scheme),
M2: second tool management mode (memory random scheme),
P: pot,
T: tool

The invention claimed is:

1. An automatic tool exchange system for a machine tool for executing a series of operations of machining a work while exchanging tools adapted to different machining steps in accordance with a predetermined machining program, the automatic tool exchange system comprising:
one or more magazines in which the tools are individually stowed in a plurality of stowage parts to which corresponding addresses are allocated, respectively;

a tool exchanger for exchanging one of the tools after use, which one tool has been mounted onto a rotary main shaft of a main body of the machine tool and another of the tools, which another of the tools is a tool for next use, which tool for next use has been kept in a standby state at an exchange position; and a control unit for driving drive units of the tool exchanger and the one or more magazines, respectively under control, wherein:

the control unit includes: a storage unit for storing tool information containing a registered correspondence relationship between each of the tools and the corresponding address of the stowage part of the magazine in which the respective tool is stowed; a modifying unit for modifying the tool information; and a tool exchange instruction unit for sequentially designating the tools to be used in each of the machining steps in accordance with the machining program, and driving the one or more magazines to move the stowage part at the address corresponding to the designated tool that is the tool for next use to a predetermined position based on the tool information so that the tool for next use is located at the exchange position at a predetermined timing; and wherein the control unit is configured to manage the tools in a mode selectively switchable between:

(i) a first tool management mode for managing the tools in a fixed address scheme so that the one tool after use is returned to one of the stowage parts that is at a registered corresponding address, and (ii) a second tool management mode for managing the tools in a memory random scheme so as to stow the one tool after use in an unoccupied one of the stowage parts of the one or more magazines at the address where the tool for next use has been previously stowed, and so as to allow the modifying unit to modify the correspondence relationship between the one tool after use and the address, which correspondence relationship has been registered in the tool information;

wherein the automatic tool exchange system further comprises a selector switch disposed on an operation panel of a numerical control device connected to the main body of the machine tool, the selector switch serving as a tool management mode switching unit for selectively switching the tool management mode between the first tool management mode and the second tool management mode.

2. The automatic tool exchange system for machine tools according to claim 1, wherein the operation panel comprises a display unit.

3. The automatic tool exchange system for machine tools according to claim 1, further comprising a carrier device for moving the tool for next use to the exchange position from the corresponding stowage part in the one or more magazines.

4. The automatic tool exchange system for machine tools according to claim 1, wherein the tool information for each of the respective tools contains: (i) a tool number given to each of the respective tools, (ii) a tool name and/or a tool type, and (iii) dimension data including a diameter and a length of the respective tool.

* * * * *